United States Patent [19]

Kono et al.

[11] Patent Number: 5,569,117
[45] Date of Patent: Oct. 29, 1996

[54] SLIP CONTROL APPARATUS FOR MOTOR VEHICLE LOCK-UP CLUTCH

[75] Inventors: Katsumi Kono, Toyota; Shinya Nakamura, Owariasahi; Atsushi Honda, Susono, all of Japan

[73] Assignee: Toyota Jidosha Kabushiki Kaisha, Toyota, Japan

[21] Appl. No.: 503,635

[22] Filed: Jul. 18, 1995

[30] Foreign Application Priority Data

Jul. 21, 1994 [JP] Japan ................................. 6-169243

[51] Int. Cl.$^6$ ........................................... F16H 61/14
[52] U.S. Cl. ......................... 477/169; 477/176; 180/197
[58] Field of Search .................... 477/169, 176; 180/197

[56] References Cited

U.S. PATENT DOCUMENTS 5,092,435  3/1992  Sone et al. ............................ 180/197

FOREIGN PATENT DOCUMENTS 2-176264  7/1990  Japan .
4-203561  7/1992  Japan .

*Primary Examiner*—Dirk Wright
*Attorney, Agent, or Firm*—Oblon, Spivak, McClelland, Maier & Neustadt, P.C.

[57] ABSTRACT

A slip control apparatus for a lock-up clutch disposed between pump and turbine impellers of a torque converter of a motor vehicle equipped with a traction control device for controlling a throttle valve of an engine so as to prevent excessive slipping of vehicle drive wheels, the apparatus including (a) a slip control device for controlling the amount of slip of the lock-up clutch such that an actual slip speed of the clutch coincides with a predetermined target value while the vehicle running condition is in a predetermined slip control area partially defined by the throttle valve opening, (b) a traction control monitoring device for detecting an operation of the traction control device, and (c) a clutch torque holding device for maintaining a present torque transmitting state of the clutch during operation of traction control device, by inhibiting a slip control operation of the slip control device or by maintaining the target slip speed of the clutch at the presently effective value.

9 Claims, 11 Drawing Sheets

| SHIFT POSITION | | SOLENOID VALVES | | C1 | C2 | B1 | B2 | F1 | B3 | F2 | C0 | F0 | B0 |
|---|---|---|---|---|---|---|---|---|---|---|---|---|---|
| | | S1 | S2 | | | | | | | | | | |
| P | | ⊗ | ⊗ | | | | | | | | ○ | | |
| R | | ⊗ | ⊗ | | ○ | | | | | | ○ | | |
| N | | ⊗ | ⊗ | | | | | | | | ○ | | |
| D | 1st | ○ | × | ○ | | | | | | | ○ | ○ | |
| | 2nd | ○ | ○ | ○ | | | ○ | | | ○ | ○ | ○ | |
| | 3rd | × | ○ | ○ | ○ | | ○ | | | | ○ | ○ | |
| | O/D | × | × | ○ | ○ | | ○ | | | | | | ○ |
| S | 1st | ○ | × | ○ | | | | | | | ○ | ○ | |
| | 2nd | ○ | ○ | ○ | | | ○ | ○ | | ○ | ○ | ○ | |
| | 3rd | × | ○ | ○ | ○ | | ○ | | | | ○ | ○ | |
| | (O/D) | × | × | ○ | ○ | | ○ | | | | | | ○ |
| L | 1st | ○ | × | ○ | | | | | ○ | | ○ | ○ | |
| | 2nd | ○ | ○ | ○ | | ○ | ○ | ○ | ○ | ○ | ○ | ○ | |

FIG. 2

SLIP CONTROL APPARATUS FOR MOTOR VEHICLE LOCK-UP CLUTCH

BACKGROUND OF THE INVENTION

1. Field of the Invention

The present invention relates to an apparatus for controlling the amount of slip of a lock-up clutch provided in a power transmitting system of a motor vehicle.

2. Discussion of the Related Art

In a motor vehicle having a fluid-filled power transmitting device equipped with a lock-up clutch such as a torque converter or fluid coupling incorporating such a lock-up clutch, it is proposed to control the lock-up clutch in a slip control mode (partially slipping or engaging mode) such that an actual amount of slip (slip speed) of the lock-up clutch, namely, a difference between the speeds of a pump impeller and a turbine impeller eventually coincides with a predetermined target slip speed, for the purpose of improving the fuel economy of the vehicle while minimizing the power loss due to slipping of the lock-up clutch. The slip control mode is established when the running condition of the vehicle is in a predetermined slip control area which is intermediate between a fully releasing area in which the lock-up clutch should be held in a fully released state, and a fully engaging area in which the lock-up clutch should be held in a fully engaging state. These fully releasing, fully engaging and slip control areas are defined by suitable parameters (e.g., throttle valve opening and vehicle running speed) indicative of the vehicle running condition.

Generally, the slip control of the lock-up clutch is implemented by a feedback slip control device adapted to control a hydraulic system which uses a hydraulic power source that permits full engagement of the lock-up clutch. The hydraulic system has a releasing oil chamber and an engaging oil chamber which are formed on the opposite sides of a piston of the lock-up clutch so that the piston is movable between fully released and fully engaged positions of the clutch, depending upon a pressure difference of the two oil chambers. The feedback slip control device is arranged to control the pressure difference of the two oil chambers for changing a force acting on the clutch piston to thereby change a friction force of the lock-up clutch and the amount of engagement or slip or the slip speed of the clutch. In this feedback control arrangement, even a small amount of change in the hydraulic pressure difference, that is, even a small amount of change of the slip control output of the slip control device will cause a considerable amount of change of the slip amount or slip speed of the lock-up clutch, since the friction force of the clutch is inherently comparatively unstable with respect to a change in the force acting on the clutch piston. In other words, the amount of slip of the lock-up clutch is sensitive to a change in the value of the slip control output of the slip control device. Thus, the feedback control of the slip amount of the clutch is comparatively unstable. In view of this drawback, a slip control equation used by the slip control device is formulated to determine the slip control output on the basis of a feed-forward control value, a feedback control value, and a learning control value, as disclosed in JP-A-4-203561.

In some motor vehicle, a traction control device is provided to prevent excessive slipping of drive wheels of the vehicle on a road surface by reducing the amount of opening of the throttle valve. If the vehicle running condition falls in the slip control area of the lock-up clutch as a result of reduction of the throttle valve opening by the traction control device, the slip control device begins to control the lock-up clutch in the slip control mode, whereby the speed difference of the pump and turbine impellers of the torque converter is reduced, and the torque ratio is lowered so that the torque which is transmitted through the torque converter is excessively reduced. When the throttle valve opening is increased to the original value by the traction control device after the slipping tendency of the drive wheels is eliminated, the slip control of the lock-up clutch by the slip control device is terminated, and the speed difference and torque ratio of the torque converter will increase, with a result of an excessive increase in the torque transmitted through the torque converter. Thus, changes in the throttle valve opening by the traction control device cause the slip control device to initiate and terminate the slip control operation of the lock-up clutch. In other words, the slip control of the lock-up clutch is considerably influenced by the operation of the traction control device which controls the amount of opening of the throttle valve. Thus, the mode in which the lock-up clutch is controlled is influenced by the changes in the throttle valve opening effected by the traction control device, and the stability of slip control of the lock-up clutch is deteriorated by the traction control.

Even if the vehicle running condition is kept within the slip control area throughout an operation of the traction control device to control the throttle valve opening, the slip control of the lock-up clutch by the slip control device may be influenced by the traction control device. Described more specifically, the target slip speed of the lock-up clutch used by the slip control device may be determined such that the target slip speed decreases with a decrease in the throttle valve opening. In this case, a decrease in the throttle valve opening by the traction control device results in reducing the target slip speed of the lock-up clutch, causing a decrease in the torque ratio of the torque converter, whereby the torque transmitted through the torque converter is excessively reduced. On the other hand, an increase in the throttle valve opening by the traction control device results in an increase in the target slip speed, causing an increase in the torque ratio and an excessive increase in the torque transmitted through the torque converter. Thus, the control stability of the lock-up clutch is deteriorated by the traction control device. If the target slip speed of the lock-up clutch is determined such that the target slip speed increases with a decrease in the throttle valve opening, a decrease in the throttle valve opening by the traction control device results in increasing the target slip speed, causing an increase in the torque ratio of the torque converter, which offsets a torque control effect of the torque converter. Similarly, the torque control effect is offset by an increase in the throttle valve opening by the traction control device, which results in reducing the target slip speed of the lock-up clutch, causing a decrease in the torque ratio of the torque converter.

SUMMARY OF THE INVENTION

It is therefore an object of the present invention to provide an apparatus for controlling the amount of slip of a lock-up clutch in a power transmitting system of a motor vehicle, which apparatus is free from an influence of a traction control device which controls the throttle valve opening so as to prevent excessive slipping of vehicle drive wheels.

The above object may be achieved according to the principle of the present invention, which provides an apparatus for controlling an amount of slip of a lock-up clutch disposed between a pump impeller and a turbine impeller of a torque converter of a motor vehicle having a traction control device for controlling throttle valve means of an engine so as to prevent excessive slipping of drive wheels of the vehicle, the apparatus including slip control means for controlling the amount of slip of the lock-up clutch in a slip control mode such that an actual slip speed of the lock-up clutch coincides with a predetermined target slip speed while a running condition of the vehicle is in a predetermined slip control area which is partially defined by an amount of opening of the throttle valve means, the apparatus comprising: (a) traction control monitoring means for determining whether the traction control device is in operation to control the amount of opening of the throttle valve means; and (b) clutch torque holding means for maintaining a present torque transmitting state of the lock-up clutch as long as the traction control monitoring means determines that the traction control device is in operation.

In the lock-up clutch slip control apparatus constructed according to the present invention, the torque transmitting state of the lock-up clutch is maintained or inhibited from changing as long as the traction control device is operated to control the amount of opening of the throttle valve means so as to prevent excessive slipping of the vehicle drive wheels. Consequently, the torque transmitted through the torque converter equipped with the lock-up clutch will not change due to the slip control of the lock-up clutch by the slip control means. Thus, the traction control is effected with high stability, without a control interference with the slip control of the lock-up clutch, which would cause an increase in the transmission torque and offsetting of the torque control effect of the torque converter, while at the same time the slip control of the lock-up clutch is effected with high stability without an influence of changes of the amount of opening of the throttle valve means which are caused by the traction control device.

In one preferred form of the present invention, the apparatus further comprises initiating condition monitoring means for determining whether a slip control initiating condition required for initiating slip control of the lock-up clutch by the slip control means is satisfied, and the clutch torque holding means inhibits the slip control means from initiating the slip control of the lock-up clutch even when the initiating condition monitoring means determines that the slip control initiating condition is satisfied, if the traction control monitoring means determines, prior to the initiation of the slip control, that the traction control device is in operation. In this form of the invention, the slip control of the lock-up clutch is inhibited even if the vehicle running condition comes into the slip control area as a result of a change in the amount of opening of the throttle valve means by the traction control device. Accordingly, the lock-up clutch remains-in the fully released position, so that the power is transmitted through the torque converter, without the torque being transmitted through the lock-up clutch. Thus, the traction control of the vehicle drive wheels can be effected with high stability without a control interference with the slip control of the lock-up clutch by the slip control means.

In another preferred form of this invention, the clutch torque holding means maintains the target slip speed at a presently effective value to thereby maintain the present torque transmitting state of the lock-up clutch, if the traction control monitoring means determines, during slip control of the lock-up clutch by the slip control means, that the traction control device is in operation. The target slip speed used in the slip control of the lock-up clutch remains unchanged even if the amount of opening of the throttle valve means is changed by the traction control device during the slip control operation of the lock-up clutch. Thus, the transmission torque of the lock-up clutch remains unchanged, and the traction control is effected with high stability, without a control interference with the slip control of the lock-up clutch.

The throttle valve means may comprise a first throttle valve operated by an accelerator pedal of the vehicle, and a second throttle valve which is normally held in a fully open position and which is controlled by the traction control device to prevent excessive slipping of the vehicle-drive wheels. In this case, the slip control means obtains, as the amount of opening of the throttle valve means, either an average or the smaller of the amounts of opening of the first and second throttle valves.

BRIEF DESCRIPTION OF THE DRAWINGS

The above and optional objects, features, advantages and technical significance of the present invention will be better understood by reading the following detailed description of a presently preferred embodiment of the invention, when considered in conjunction of the accompanying drawings, in which:

FIG. 2 is a table indicating a relationship between the operating positions of an automatic transmission connected to the torque converter and the respective combinations of the operating states of first and second solenoid-operated valves of the slip control apparatus;

DETAILED DESCRIPTION OF THE PREFERRED EMBODIMENT

Figure 1:
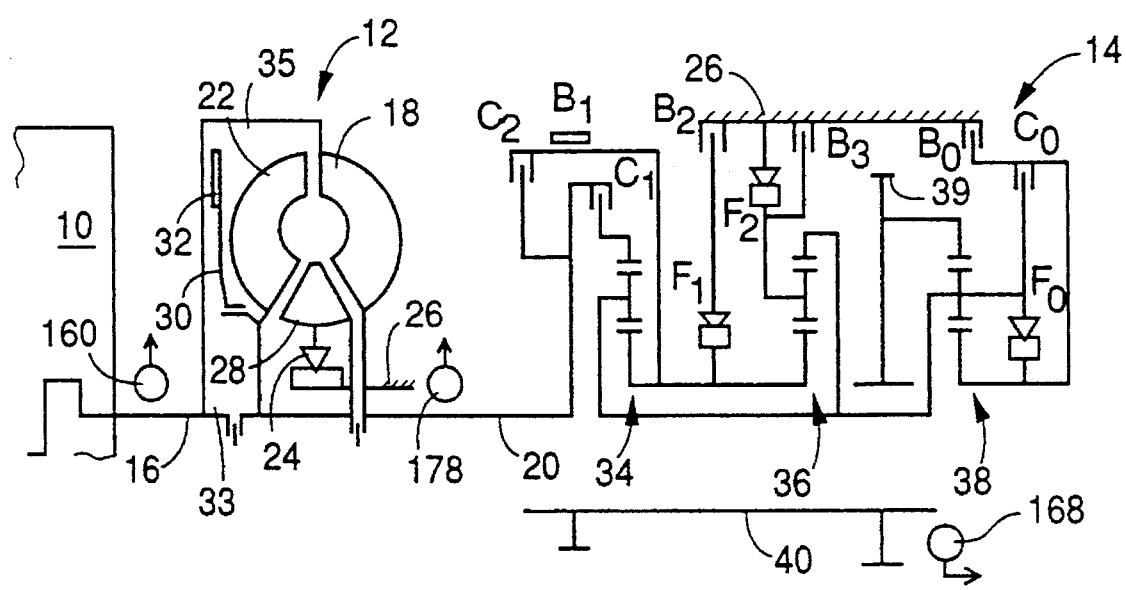
FIG. 1 is a schematic view illustrating a part of a power transmitting system of a motor vehicle, which incorporates a torque converter having a lock-up clutch to be controlled by a slip control apparatus constructed according to one embodiment of the present invention.

Referring first to the schematic view of FIG. 1, there is shown a part of a power transmitting system of a motor vehicle, wherein power generated by an engine 10 is transmitted to a differential gear device and drive wheels through a torque converter 12 equipped with a lock-up clutch 32, and an automatic transmission 14 which includes three planetary gear sets to selectively establish a plurality of operating positions (gear positions).

The torque converter 12 includes; a pump impeller 18 connected to a crankshaft 16 of the engine 10; a turbine impeller 22 fixed to an input shaft of the automatic transmission 14 and rotatable by the pump impeller 18; a stator impeller 28 fixed to a stationary member in the form of a housing 26 through a one-way clutch 24; and the above-indicated lock-up clutch 32 connected to the input shaft 20 through the turbine impeller 22. The pump impeller 18 includes a radially outer portion which is U-shaped in cross section, and a plurality of curved vanes which are arranged in the circumferential direction and formed so as to cause a flow of a working oil, which flow includes a component moving toward the turbine impeller 22 on the side of the engine 10. The turbine impeller 22 includes a plurality of curved vanes opposed to the vanes of the pump impeller 18. In operation of the torque converter 12, the turbine impeller 22 is rotated by the oil flow from the vanes of the pump impeller 18 rotated by the engine 10. The lock-up clutch 32 includes a piston 30 which engages a hub of the turbine impeller 22 such that the piston 30 is axially slidable relative to and rotatable with the turbine impeller 22.

The piston 30 of the lock-up clutch 32 divides an interior of the torque converter 12 into two oil chambers 33 and 35. The lock-up clutch 32 is released and engaged by axial movements of the piston 32 depending upon a difference between oil pressures in these two oil chambers 33, 35, which will be hereinafter referred to as a releasing oil chamber 33 and an engaging oil chamber 35, respectively. Described more specifically, the piston 30 is retracted to its fully retracted position when the pressure in the releasing oil chamber 33 is increased while the engaging oil chamber 35 is drained. When the pressure in the engaging oil chamber 35 is increased while the releasing oil chamber 33 is held at the lowest level, the piston 30 is advanced to its fully advanced position. In the fully retracted position of the piston 30, the lock-up clutch 32 is placed in its fully released position in which the torque received by the pump impeller 18 is amplified or boosted at a ratio depending upon the ratio of the input and output speeds of the torque converter 12. In the fully advanced position of the piston 30, the lock-up clutch 32 is placed in the fully engaged-position in which the frictional coupling portion of the clutch 32 is forced against the radially outer U-shaped portion of the pump impeller 18, whereby the pump impeller 18 is directly connected to the input shaft 20, that is, the crankshaft 16 as an input member of the torque converter 12 is directly connected to the input shaft 20 of the transmission 14, which serves as an output member of the torque converter 12. When the pressure in the releasing oil chamber 33 is increased to a predetermined level while the pressure in the engaging oil chamber 35 is held at a higher level, the piston 30 is advanced to a predetermined position in which the frictional coupling portion of the lock-up clutch is located near the corresponding coupling portion (radially outer U-shaped portion) of the pump impeller 18. The predetermined level of the pressure in the releasing oil chamber 33 indicated above is determined by a second term ("feed forward term") of a right member of an equation (2) which will be described.

The automatic transmission 14 includes: the input shaft 20, a first, a second and a third planetary gear set 34, 36, 38; an output gear 39 which rotates with a ring gear of the third planetary gear set 38; and an output shaft in the form of a counter shaft 40 which connects the output gear 39 and the differential gear device. The planetary gear sets 34, 36, 38 include components which are connected integrally with each other, and components which are connected to each other when three clutches C0, C1, C2 are selectively engaged. The planetary gear sets 34, 36, 38 also include components which are fixed or connected to the housing 26 and thereby inhibited from rotating when four brakes B0, B1, B2, B3 are selectively engaged. The planetary gear sets 34, 36, 38 further include components which are connected to each other or to the housing 26 through three one-way clutches F0, F1, F2, depending upon the rotating directions of the components.

Each of the clutches C0, C1, C2 and brakes B0, B1, B2, B3 may consist of a multiple-disk clutch, or a band brake which uses two bands wound in opposite directions. These clutches and brakes are operated by respective hydraulically operated actuators, which are controlled by an electronic transmission controller 184 shown in FIG. 3 (which will be described), so as to selectively establish a plurality of operating positions of the automatic transmission 14. That is, the automatic transmission 14 has four forward drive positions, first-speed ("1st"), second-speed ("2nd"), 3rd-speed ("3rd") and overdrive ("O/D") positions, and one backward drive position "R", as indicated in FIG. 2. The four forward drive positions "1st", "2nd", "3rd" and "O/D" have respective different speed ratios I which decrease in the order of description. The speed ratio I is defined as the speed of the input shaft 20 divided by the speed of the counter shaft (output shaft) 40.

It is to be noted that the lower halves of the torque converter 12 and automatic transmission 14 and the upper half of the counter shaft 40 are not shown in FIG. 1 in the interest of simplification, since these elements 12, 14, 40 are symmetrical with respect to their axes of rotation.

Referring next to the block diagram of FIG. 3, there will be described a control system provided to control the engine 10, lock-up clutch 32 and automatic transmission 14 of the motor vehicle. The control system includes the electronic transmission controller 184 indicated above, which is adapted to control a hydraulic control device 44. The hydraulic control device 44 includes a transmission control circuit for shifting the automatic transmission 14 to an appropriate one of the operating positions, and a lock-up clutch control circuit for controlling the operating state of the lock-up clutch 32. The transmission control circuit is provided with a first and a second solenoid-operated valve S1, S2, which have respective solenoid coils. The clutches C0, C1, C2 and brakes B0, B1, B2, B3 are selectively engaged to selectively establish the operating positions ("ist", "2nd", "3rd" and "O/D") of the transmission 14, depending upon respective combinations of the operating states of the first and second solenoid-operated valves S1, S2, as indicated in FIG. 2. In this figure, "o" indicates the energization of the solenoid coils of the valves S1, S2 or the engagement of the clutches and brakes.

Figure 4:
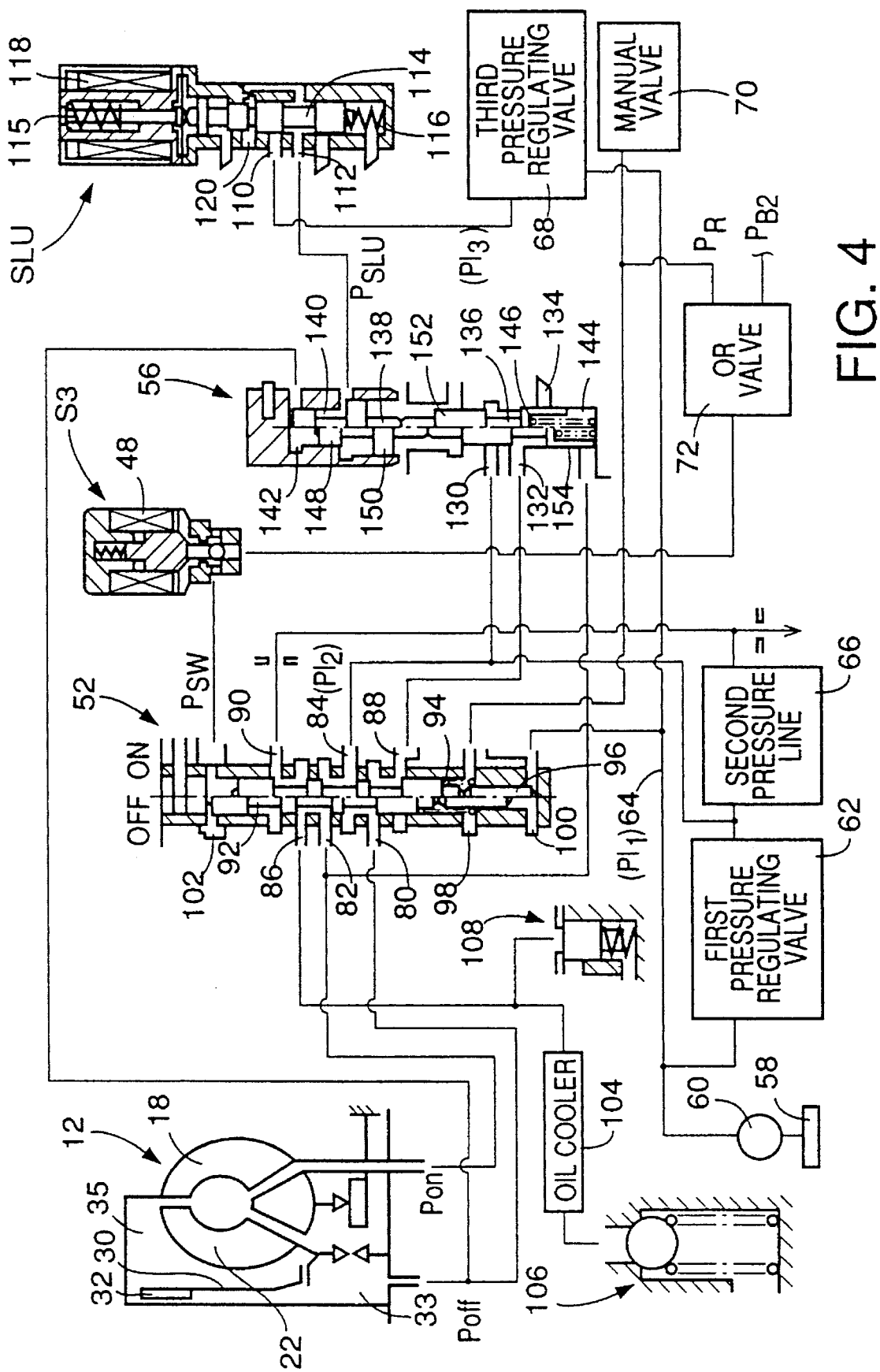
FIG. 4 is a view illustrating a part of a hydraulic control device shown in FIG. 3, which incorporates a circuit for controlling the lock-up clutch.
Figure 5:
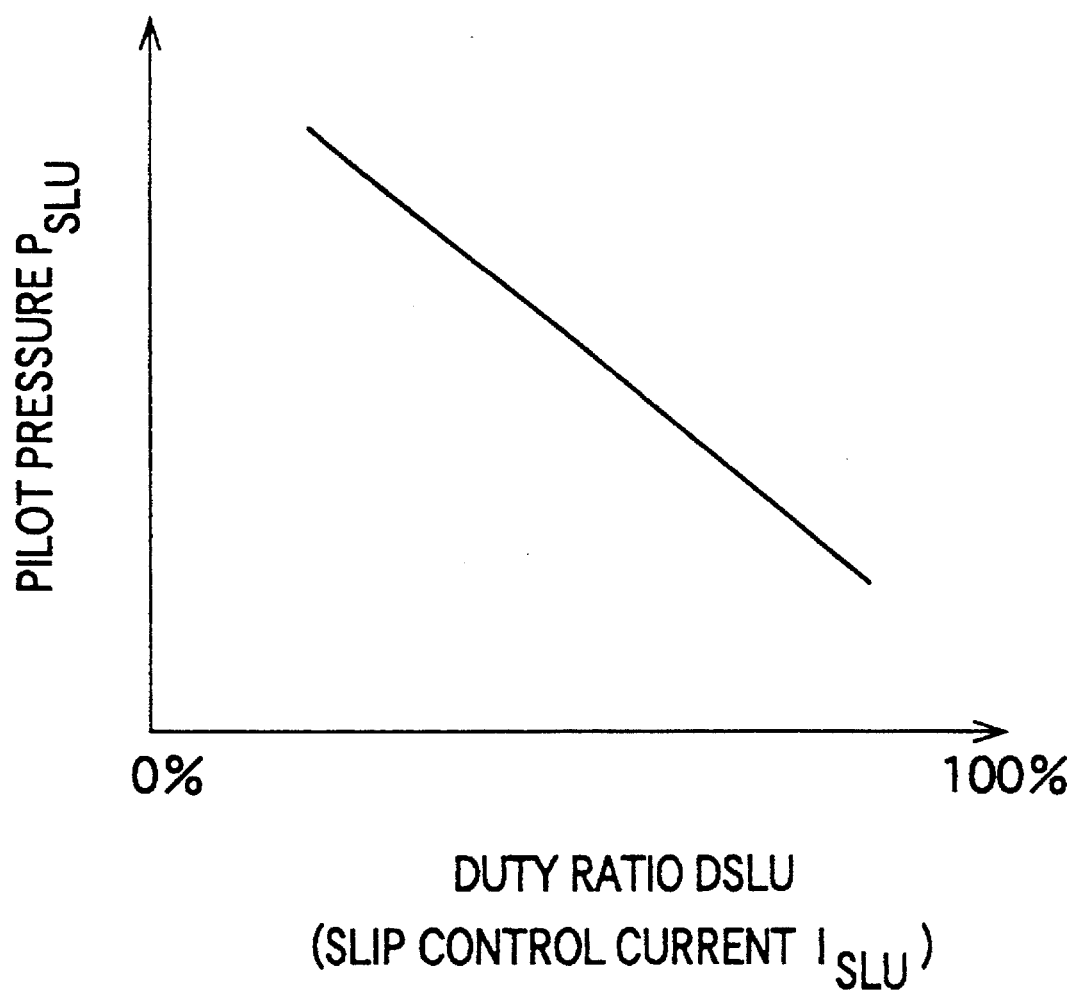
FIG. 5 is a graph indicating an output characteristic of a linear solenoid valve provided in the lock-up clutch control circuit of FIG. 4.

The lock-up clutch control circuit of the hydraulic control device 44 includes a third solenoid-operated valve S3, a lock-up relay valve 52, a linear solenoid valve SLU, and a lock-up clutch control valve 56, as shown in FIG. 4. The third solenoid-operated valve S3 has a solenoid coil 48 which is turned on and off. When the coil 48 is on, the valve 53 generates a LOCK-UP SWITCHING pressure $P_{SW}$. The lock-up relay valve 52 has a releasing state and an engaging state for releasing and engaging the lock-up clutch 32, respectively, depending upon whether the pilot pressure $P_{SW}$ is generated by the valve S3. The linear solenoid valve SLU is adapted to generate a SLIP CONTROL pilot pressure $P_{SLU}$ corresponding to a SLIP CONTROL current $I_{SLU}$ supplied from the transmission controller 184. The lock-up clutch control valve 56 is adapted to regulate a pressure difference $\Delta P$ between the pressures in the engaging and releasing oil chambers 35, 33 of the torque converter 12, according to the SLIP CONTROL pilot pressure $P_{SLU}$ received from the linear solenoid valve SLU, for thereby controlling an amount of slip of the lock-up clutch 32.

As shown in FIG. 4, the hydraulic control device 44 includes a pump 60 for pressuring a working oil sucked from a suitable reservoir through a strainer 58. The pump 60 is driven by the engine 10. The pressure of the oil delivered by the pump 60 is adjusted to a first line pressure Pl1 by a first pressure regulating valve 62 of an overflow type. The first pressure regulating valve 62 is arranged to receive a THROTTLE pilot pressure indicative of the amount of opening of a first throttle valve 166 (FIG. 3), and regulate the first line pressure Pl1 in a first pressure line 64 such that the pressure Pl1 increases with the THROTTLE pilot pressure. The hydraulic control device 44 further has a second pressure regulating valve 66 of an overflow type, which is adapted to regulate the pressure of the oil received from the first pressure regulating valve 62, to a second line pressure Pl2 according to the THROTTLE pressure, so that the second line pressure Pl2 corresponds to the output torque of the engine 10. The device 44 further has a third pressure regulating valve 68, which is a pressure reducing valve adapted to reduce the first line pressure Pl1 to a predetermined third line pressure Pl3.

The motor vehicle has a shift lever 174 (FIG. 3) which has six operating positions "P" (PARKING), "R" (REVERSE), "N" (NEUTRAL), "D" (DRIVE), "S" (SECOND) and "L" (LOW), as indicated in FIG. 2. The hydraulic control device 44 includes a manual valve 70 (FIG. 4) adapted to generate a REVERSE pressure $P_R$ when the shift lever 174 is placed in the REVERSE position "R" (which is the backward drive position referred to above with respect to the automatic transmission 14). The device 44 also includes an OR valve 72 which is adapted to generate a higher one of a BRAKE B2 pressure $P_{B2}$ and the REVERSE pressure $P_R$, which serves as the LOCK-UP SWITCHING pilot pressure $P_{SW}$ generated when the valve S3 is turned ON as explained below in detail. The BRAKE B2 pressure $P_{B2}$ is generated to engage the brake B2 for establishing the second-speed ("2nd"), third-speed ("3rd") and overdrive ("O/D") positions.

The lock-up relay valve 52 has: a releasing port 80 communicating with the releasing oil chamber 33; an engaging port 82 communicating with the engaging oil chamber 35; an input port 84 adapted to receive the second line pressure Pl2; a first drain port 86 through which the oil in the engaging oil chamber 35 is discharged when the lock-up clutch 32 is released; a second drain port 88 through which the oil in the releasing oil chamber 33 is discharged when the lock-up clutch 32 is engaged; a supply port 90 adapted to receive the oil discharged from the second pressure regulating valve 66 so that the oil is cooled during engagement of the lock-up clutch 32; a spool 92 operable between an ON position and an OFF position, for switching the mutual communication or connection of the ports indicated above; a spring 94 for biasing the spool 92 toward the OFF position; a plunger 96 abuttable on the end of the spool 92 on the side of the spring 94; an oil chamber 98 defined between the above-indicated end of the spool 92 and the opposed end of the plunger 96, and adapted to receive the REVERSE pressure $P_R$ from the manual valve 70; an oil chamber 100 partially defined by the other end of the plunger 96 and adapted to receive the first line pressure Pl1; and an oil chamber 102 partially defined by the other end of the spool 92 and adapted to receive the LOCK-UP SWITCHING pressure $P_{SW}$ from the third solenoid-operated valve S3, for generating a thrust force for moving the spool 92 toward the ON position.

The third solenoid-operated valve S3 has a ball which is seated on a valve seat to disconnect a line communicating with the oil chamber 102 of the lock-up relay valve 52 and the OR valve 72 when the solenoid coil 48 is de-energized or OFF. In this state, the LOCK-UP SWITCHING pilot pressure $P_{SW}$ is not applied to the oil chamber 102. When the coil 48 is energized or ON, the ball is unseated to permit the communication between the OR valve 72 and the oil chamber 102, whereby the LOCK-UP SWITCHING pressure $P_{SW}$ is applied to the oil chamber 102. In the OFF state of the valve S3, therefore, the spool 92 of the lock-up relay valve 52 is moved to its OFF position by the biasing force of the spring 94 and a force based on the first line pressure Pl1 in the oil chamber 100, whereby the input port 84 communicates with the releasing port 80 while the first drain port 86 communicates with the engaging port 82. As a result, a pressure Poff in the releasing oil chamber 33 is made higher than a pressure Pon in the engaging oil chamber 35, to thereby release the lock-up clutch 32, while at the same time the engaging chamber 35 is drained through the first drain port 86, an oil cooler 104 and a check valve 106.

In the ON state of the valve S3, on the other hand, the LOCK-UP SWITCHING pilot pressure $P_{SW}$ is applied to the oil-chamber 102, and the spool 92 is moved by a force based on the pressure $P_{SW}$ against the biasing force of the spring 94 and the force based on the first line pressure Pl1 in the oil chamber 100, whereby the input port 84 communicates with the engaging port 82 while the first and second drain ports 86, 88 communicates with the supply and releasing ports 90, 80, respectively. As a result, the pressure Pon in the engaging oil chamber 35 is made higher than the pressure Poff in the releasing oil chamber 33, to thereby engage the lock-up clutch, while at the same time the releasing oil chamber 33 is drained through the second drain port 88 and the lock-up clutch control valve 56.

The linear solenoid valve SLU is a reducing valve adapted to reduce the predetermined third line pressure Pl3 to the SLIP CONTROL pilot pressure $P_{SLU}$, such that the pilot pressure $P_{SLU}$ increases with an increase in the SLIP CONTROL current $I_{SLU}$ supplied from the transmission controller 184, namely, increases with an increase in a duty ratio $D_{SLU}$ of the linear solenoid valve SLU. The thus controlled pilot pressure $P_{SLU}$ is applied to the lock-up clutch control valve 56. The linear solenoid valve SLU has: a supply port 110 adapted to receive the third line pressure Pl3; an output port 112 from which the SLIP CONTROL pilot pressure $P_{SLU}$ is applied to the valve 56; a spool 114 for closing and opening the ports 110, 112; a spring 115 for biasing the spool 114 in a valve closing direction; a spring 116 for biasing the spool 114 in a valve opening direction by a force smaller than that of the spring 115; a solenoid coil 118 for biasing the spool 114 in the valve opening direction by a force determined by the SLIP CONTROL current $I_{SLU}$; and an oil chamber 120 adapted to receive a feedback pressure (SLIP CONTROL pilot pressure $P_{SLU}$) which biases the spool 114 in the valve closing direction. The spool 114 is moved to a position of equilibrium between a sum of the biasing forces of the solenoid coil 118 and the spring 116 and a sum of the biasing force of the spring 115 and a force based on the feedback pressure $P_{SLU}$.

The lock-up clutch control valve 56 has: a line pressure port 130 adapted to receive the second line pressure Pl2 an input port 132 adapted to receive the oil discharged from the releasing oil chamber 33 through second drain port 88 of the valve 52; a drain port 134 through which the oil received by the input port 132 is discharged; a spool 136 operable between a first position (indicated at left in FIG. 4) and a second position (indicated at right in FIG. 4); a plunger 138 abuttable on the spool 136 for biasing the spool 136 toward the first position; an oil chamber 140 adapted to receive the SLIP CONTROL pilot pressure $P_{SLU}$ for biasing the plunger 138 so as to generate a thrust force which biases the spool 136 toward the first position; an oil chamber 142 adapted to receive the oil pressure Poff in the releasing oil chamber 33, for biasing the plunger 138 so as to generate a thrust force which biases the spool 136 toward the first position; an oil chamber 144 adapted to receive the oil pressure Pon in the engaging oil chamber 35, for generating a thrust force for biasing the spool 136 toward the second position; and a spring 146 received in the oil chamber 144, for biasing the spool 136 toward the second position.

In the first position of the spool 136 of the lock-up clutch control valve 56, the input port 132 communicates with the drain port 134 to cause the releasing oil chamber 33 to be drained, for thereby increasing the pressure difference $\Delta P$ (=Pon−Poff) of the oil chambers 33, 35. In the second position of the spool 136, the input port 132 communicates with the line pressure port 130 to cause the second line pressure Pl2 to be applied to the releasing oil chamber 33, for thereby reducing the pressure difference $\Delta P$.

The plunger 138 has a first land 148 adjacent to the oil chamber 142, and a second land 150 remote from the oil chamber 142. The first land 148 has a cross sectional area A1, and the second land 150 has a cross sectional area A2 larger than the area A1. The spool 136 has a third land 152 adjacent to the pilot pressure oil chamber 140, and a fourth land 154 remote from the oil chamber 140. The third land 152 has a cross sectional area A3, and the fourth land 154 has a cross sectional area equal to the cross sectional area A1. In this arrangement of the lock-up clutch control valve 56, the plunger 138 and the spool 136 are moved together as a unit with the plunger 138 held in abutting contact with the spool 136. With the movement of the plunger and spool 138, 136, the pressure difference $\Delta P$ (=Pon−Poff) on the opposite sides of the piston 30 of the lock-up clutch 32 is controlled depending upon the SLIP CONTROL pilot pressure $P_{SLU}$ generated by the linear solenoid valve SLU. The pressure difference $\Delta P$ changes with the pilot pressure $P_{SLU}$ as shown in FIG. 6, at a rate or gradient represented by a value (A2−A1)/A1 included in the following equation (1):

$$\Delta P = Pon - Poff = [(A2-A1)/A1]P_{SLU} - Fs/A1 \quad (1)$$

where, Fs: biasing force of the spring 146.

Figure 6:
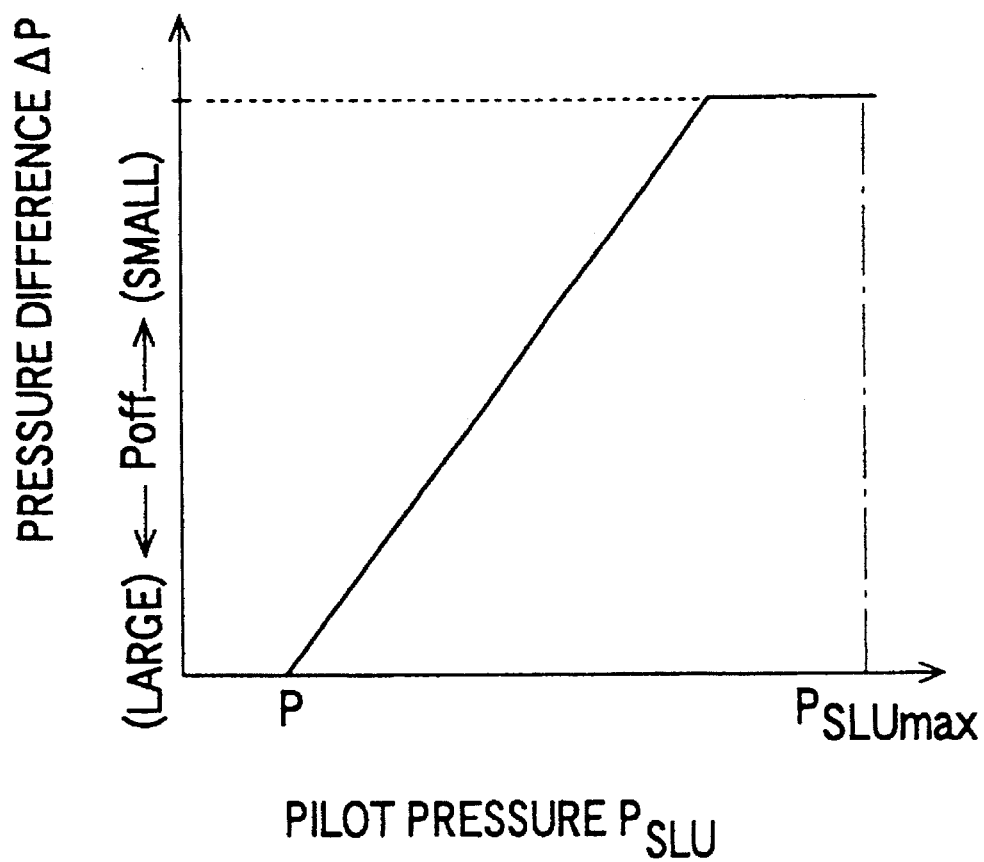
FIG. 6 is a graph indicating an output characteristic of a lock-up clutch control valve provided in the lock-up clutch control circuit of FIG. 4, namely, a relationship between a pilot pressure $P_{SLU}$ received by the lock-up clutch control valve and a pressure difference $\Delta P$ of engaging and releasing oil chambers of the lock-up clutch.

The graph of FIG. 6 indicates the output characteristic of the lock-up clutch control valve 56, namely, the relationship between the pressure difference $\Delta P$ generated by the valve 56 and the SLIP CONTROL pilot pressure $P_{SLU}$ generated by the valve SLU. While the lock-up clutch control valve 56 is ON with the spool 136 placed in the first position, an increase in the pilot pressure $P_{SLU}$ results in an increase in the pressure difference $\Delta P$ of the engaging and releasing oil chambers 35, 33, and thereby causes a decrease in a slip speed $N_{SLP}$ of the lock-up clutch 32, while a decrease in the pilot pressure $P_{SLU}$ causes an increase in the slip speed $N_{SLP}$. The slip speed $N_{SLP}$ is a difference ($N_P - N_T$) between a speed $N_P$ of the pump impeller 18 (speed $N_E$ of the engine 10) and a speed $N_T$ of the turbine impeller 22 (speed Nin of the input shaft 20).

Figure 3:
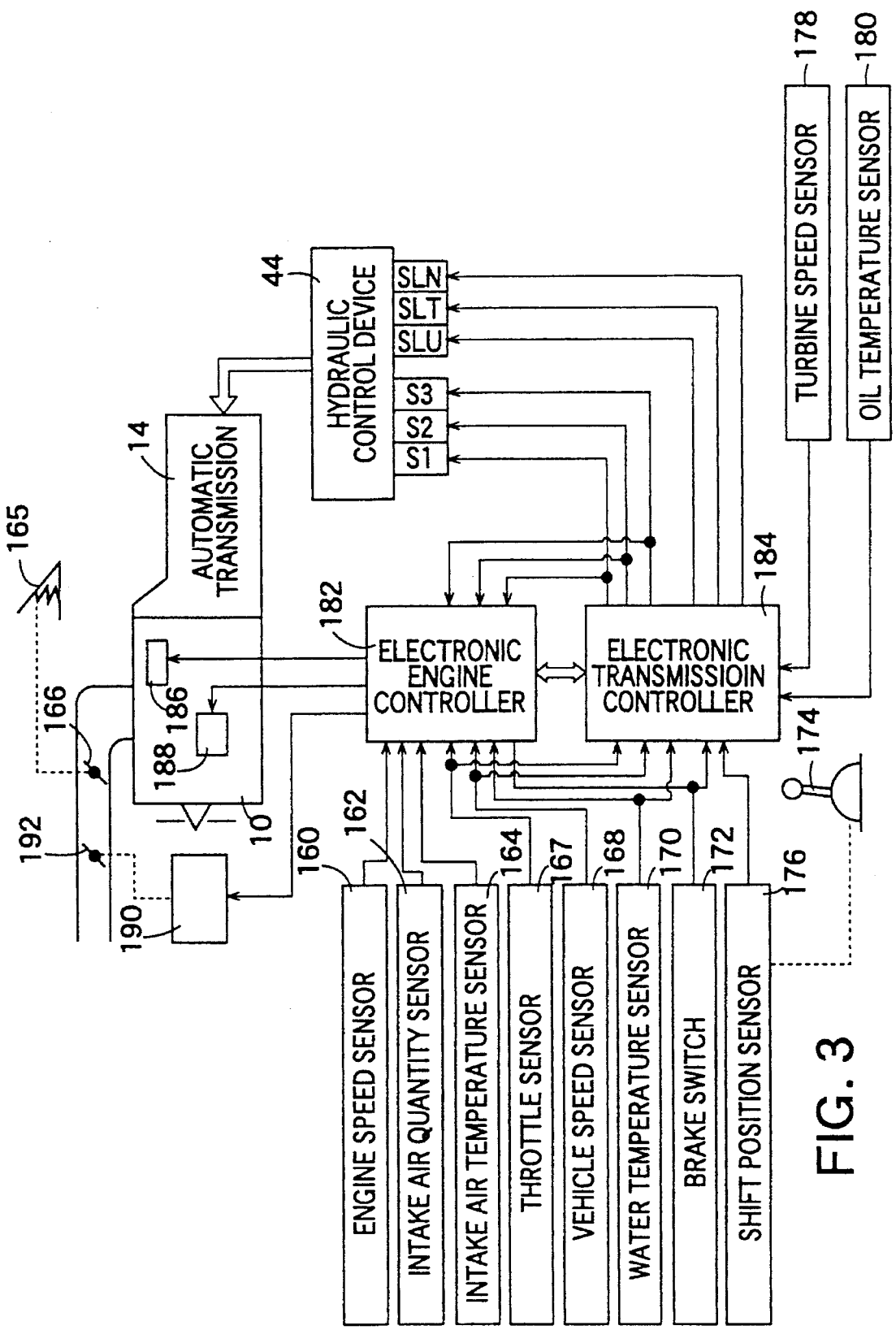
FIG. 3 is a diagram showing a control system for the motor vehicle, which includes a transmission controller incorporating the slip control apparatus for the lock-up clutch.

Referring back to the block diagram of FIG. 3, the motor vehicle has various sensors and switches including: an engine speed sensor 160 for detecting the speed $N_E$ of the engine 10, that is, speed $N_P$ of the pump impeller 18; an intake air quantity sensor 162 for detecting a quantity Q of an intake air sucked into the engine 10 through an intake pipe; an intake air temperature sensor 164 for detecting a temperature $T_{AIR}$ of the intake air; a throttle sensor 167 for detecting the amount of opening θ1 of the first throttle valve 166 operated by an accelerator pedal 165, the throttle sensor 167 being equipped with an idling position switch for detecting the idling position of the throttle valve 166; a vehicle speed sensor 168 for detecting a running speed V of the vehicle on the basis of a speed Nout of the output shaft 40 of the automatic transmission 40; a water temperature sensor 170 for detecting a temperature $T_{WA}$ of a coolant water of the engine 10; a brake switch 172 for detecting an operation of a brake pedal; a shift position sensor 176 for detecting a currently selected operating position Ps of the automatic transmission 40, namely, a currently selected one of the operating positions "L", "S", "D", "N", "R" and "P" of the shift lever 174; a turbine speed sensor 178 for detecting the speed $N_T$ of the turbine impeller 22, that is, the speed Nin of the input shaft 20 of the transmission 20; and an oil temperature sensor 180 for detecting a temperature $T_{OIL}$ of the working oil in the hydraulic control device 44. The output signals generated by the above sensors and switch are applied directly or indirectly to an electronic engine controller 182 and the electronic transmission controller 184. The two controllers 182, 184 are connected to each other by a communication interface, for applying the necessary signals to each other.

The transmission controller 184 is comprised of a so-called microcomputer incorporating a central processing unit (CPU), a read-only memory (ROM), a random-access memory (RAM) and an interface. The CPU processes the input signals according to various control programs stored in the ROM, while utilizing a temporary data storage function of the RAM, for controlling the automatic transmission 14 and the lock-up clutch 32 by controlling the first, second and third solenoid-operated valves S1, S2, S3 and the linear solenoid valve SLU.

For controlling the automatic transmission 14 so as to shift the transmission 14 to the appropriate operating position, a plurality of shift patterns are stored in the ROM, and one of the shift patterns which corresponds to the currently selected position of the transmission 14 is selected to determine the operating position (one of the four forward drive positions) to which the transmission 14 should be shifted down or up. For instance, each shift pattern consists of a shift-down boundary line and a shift-up boundary line which are relationships between the throttle valve opening 81 and the vehicle speed V. On the basis of the determined forward drive position to which the transmission 14 should be shifted, the solenoid-operated valves S1 and S2 are suitably controlled (with their solenoid coils being suitably energized or de-energized), so as to establish an appropriate combination of the operating states of the clutches and brakes C0, C1, C2, B0, B1, B2, B3, which combination corresponds to the determined forward drive position.

Figure 7:
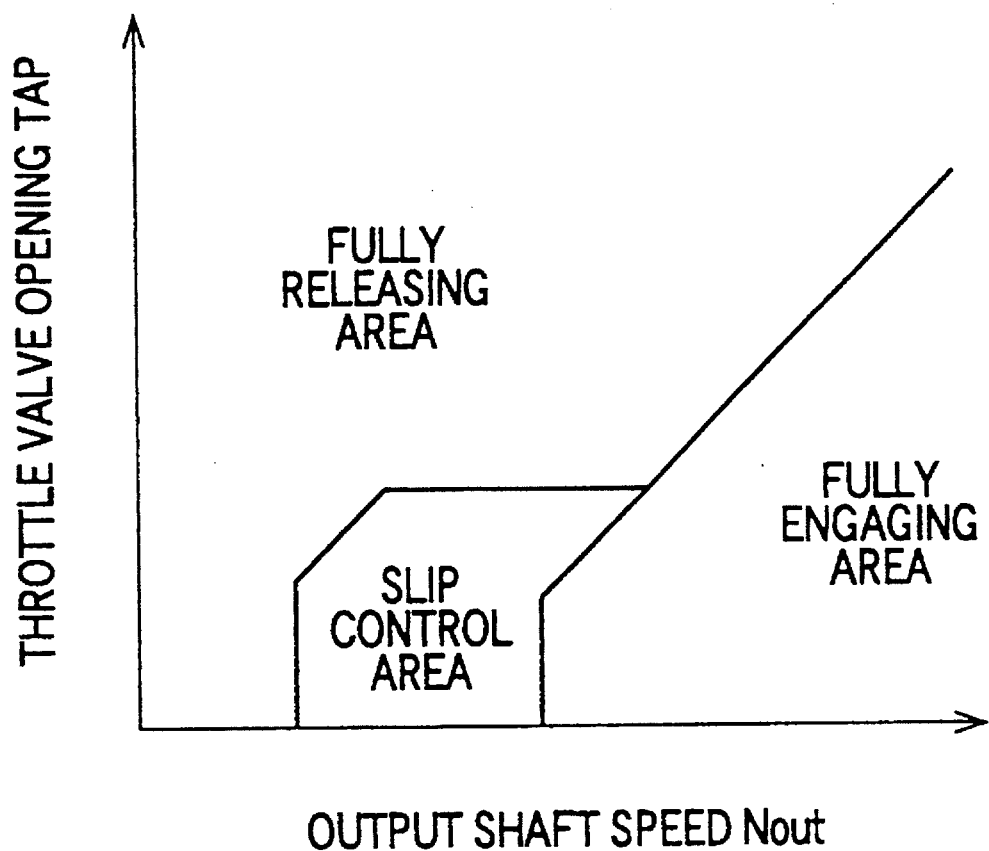
FIG. 7 is a view indicating boundaries defining different control areas of the lock-up clutch in relation to the running condition of the vehicle, which boundaries are stored in the slip control apparatus shown in FIG. 3.

The transmission controller 184 is adapted to control the lock-up clutch 32 in the manner explained below, when the vehicle is running with the transmission 14 placed in the third-speed or fourth-speed or overdrive position ("3rd" or "O/D"), for example. For controlling the lock-up clutch 32 differently depending upon the running condition of the vehicle, predetermined boundaries defining three different control areas as indicated in FIG. 7 are stored in the ROM. For instance, the boundaries are relationships between a throttle valve opening TAP (which will be described) and the output speed Nout of the output shaft 40 of the transmission 14 (vehicle speed V). Described more specifically, these boundaries define a fully releasing area in which the lock-up clutch 32 should be fully released, a fully engaging area in which the clutch 32 should be fully engaged, and a slip control area in which the amount of slip of the clutch 32 should be suitably controlled according to the principle of the present invention as described below in detail. Depending upon the currently detected throttle opening TAP and output speed Nout, one of the three control areas is determined or selected by the CPU of the transmission controller 184, according to the boundaries stored in the ROM.

When the vehicle running condition (TAP and Nout) is in the slip control area, the lock-up clutch 32 is controlled to be held in a partially slipping state for transmitting power of the engine 10 to the automatic transmission 14 so as to maximize the fuel economy of the vehicle while absorbing a torque variation of the engine 10 to assure high drivability of the vehicle. The determination as to whether the vehicle running condition falls in the slip control area according to the boundaries of FIG. 7 stored in the ROM is effected while the vehicle is accelerating. In this respect, it is noted that the amount of slip of the lock-up clutch 32 is also controlled while the vehicle is coasting or decelerating with the throttle valve 166 placed in the idling position. This slip control is effected to increase an effect of the fuel-cut control of the engine 10. In this case, however, the slip control area is determined on the basis of only the vehicle speed V, since the throttle valve opening TAP is zero during the coasting of the vehicle.

If the CPU of the controller 184 determines that the vehicle running condition falls in the fully engaging area, the solenoid coil of the third solenoid-operated valve S3 is energized to turn ON the lock-up relay valve 52, and the SLIP CONTROL current $I_{SLU}$ applied to the linear solenoid valve SLU is reduced to the minimum value, whereby the lock-up clutch 32 is fully engaged. If the vehicle running condition is determined to be in the fully releasing area, the solenoid coil of the valve S3 is de-energized to turn OFF the lock-up relay valve 52, so that the lock-up clutch 32 is fully released irrespective of the SLIP CONTROL current $I_{SLU}$. If the vehicle running condition is determined to be in the slip control area, the solenoid coil of the valve S3 is energized to turn ON the lock-up relay valve 52, and the SLIP CONTROL current $I_{SLU}$ to be applied to the valve SLU, that is, the duty ratio $D_{SLU}$ of the valve SLU is adjusted according to the following equation (2) to control the amount of slip of the lock-up clutch 32 in a slip control mode:

$$D_{SLU} (I_{SLU}) = DFWD + tKGD + DFB \quad (2)$$

For instance, the duty ratio $D_{SLU}$ (%) (=SLIP CONTROL current $I_{SLU}$) is calculated to zero a control error $\Delta E$ (=$N_{SLP}$−$TN_{SLP}$) between a target slip speed $TN_{SLP}$ and the actual slip speed $N_{SLP}$ (=$N_E$−$N_T$) of the lock-up clutch 32. The first term DFWD of the right member of the above equation (2) is a feed-forward control value which varies as a function of the output torque of the engine 10, for example. The second term tKGD is a learning control value which is updated so as to reflect the varying operating characteristics of the lock-up clutch 32. The third term DFB is a feedback control value calculated according to the following equation (3), for example. The feedback control value DFB is a sum of a proportional value, a differential value and an integral value of the control error $\Delta E$.

$$DFB = K_P[\Delta E + (1/T1) \int \Delta E dt + T_D (d\Delta E/dt)] \quad (3)$$

The electronic engine controller 182 is comprised of a microcomputer similar to that of the transmission controller 184, which has a CPU adapted to process the input signals according to programs stored in a ROM while utilizing a temporary data storage function of a RAM, for controlling the engine 10, more specifically, for effecting: a fuel injection control for controlling a fuel injection valve 186 so as to optimize the combustion condition of the engine 10; an ignition control for controlling an ignitor 188 so as to optimize the ignition timing; a traction control for controlling a normally-fully-open second throttle valve 192 via a throttle actuator 190 so as to control the traction force of the vehicle while preventing slipping of the drive wheels on the road surface; and a fuel-cut control for holding the fuel injection valve 186 closed while the engine speed $N_E$ is higher than a predetermined fuel-cut threshold level $N_{CUT}$ during coasting of the vehicle, so that the fuel economy of the vehicle is improved.

In the traction control, slip ratios of the drive wheels are calculated on the basis of the detected rotating speeds of the non-driven wheels and the drive wheels, and the throttle valve 192 is controlled such that the actual slip ratios of the drive wheels are held within a predetermined range. The traction control involves an adjustment of the ignition timing and brake application to the drive wheels as needed. The traction control is effected by a traction control device 198 shown in FIG. 8, which will be described. It will be understood that the traction control device 198 is constituted by a portion of the engine controller 182 assigned to effect the traction control, the throttle actuator 190 and the second throttle valve 192.

Figure 8:
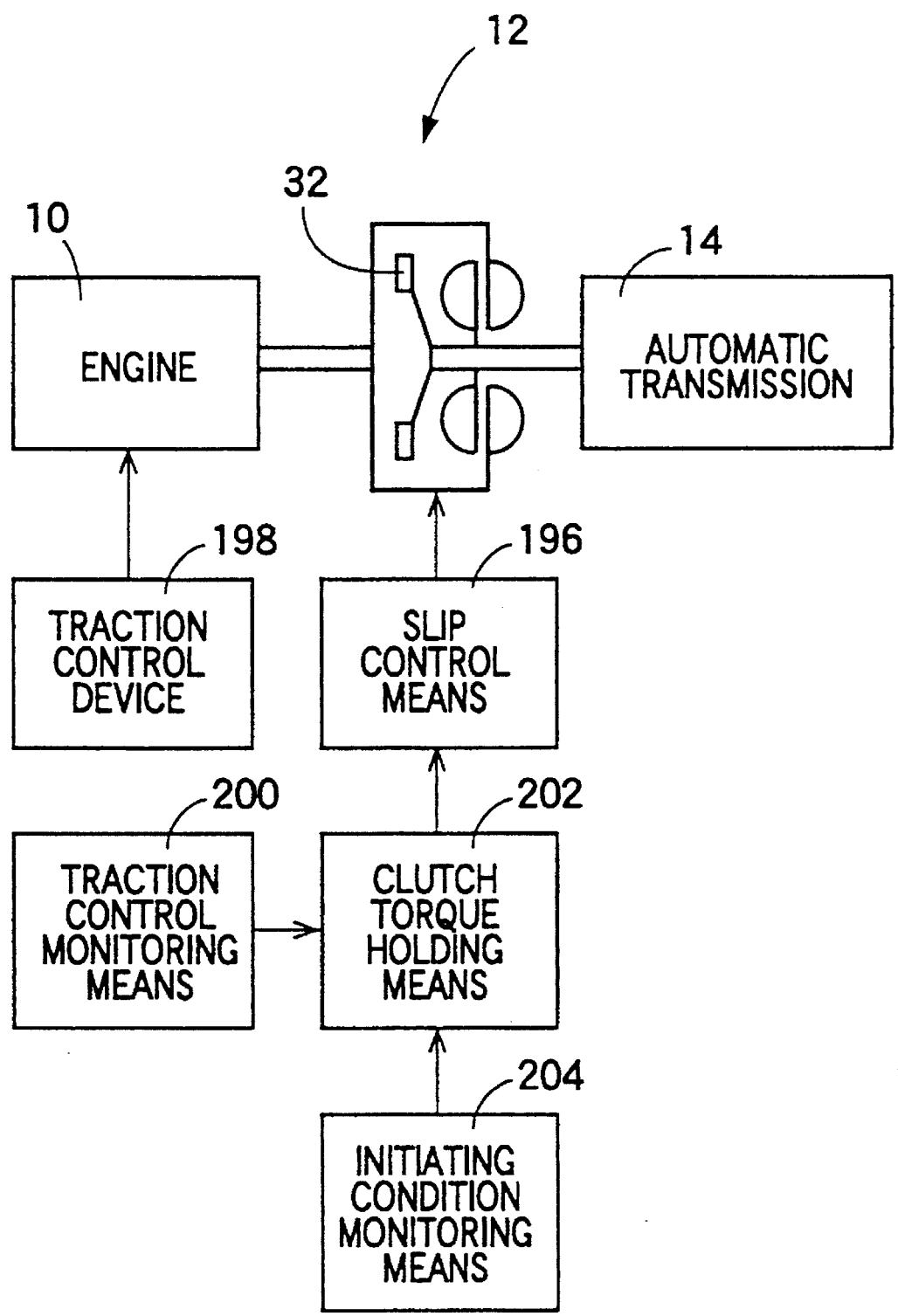
FIG. 8 is a block diagram illustrating the functions of various functional means incorporated in the slip control apparatus.

Referring next to the block diagram of FIG. 8, there will be described the functions of various functional means provided in the electronic transmission controller 184. That is, the transmission controller 184 incorporates slip control means 196, traction control monitoring means 200, clutch torque holding means 202, and initiating condition monitoring means 204.

Figure 10:
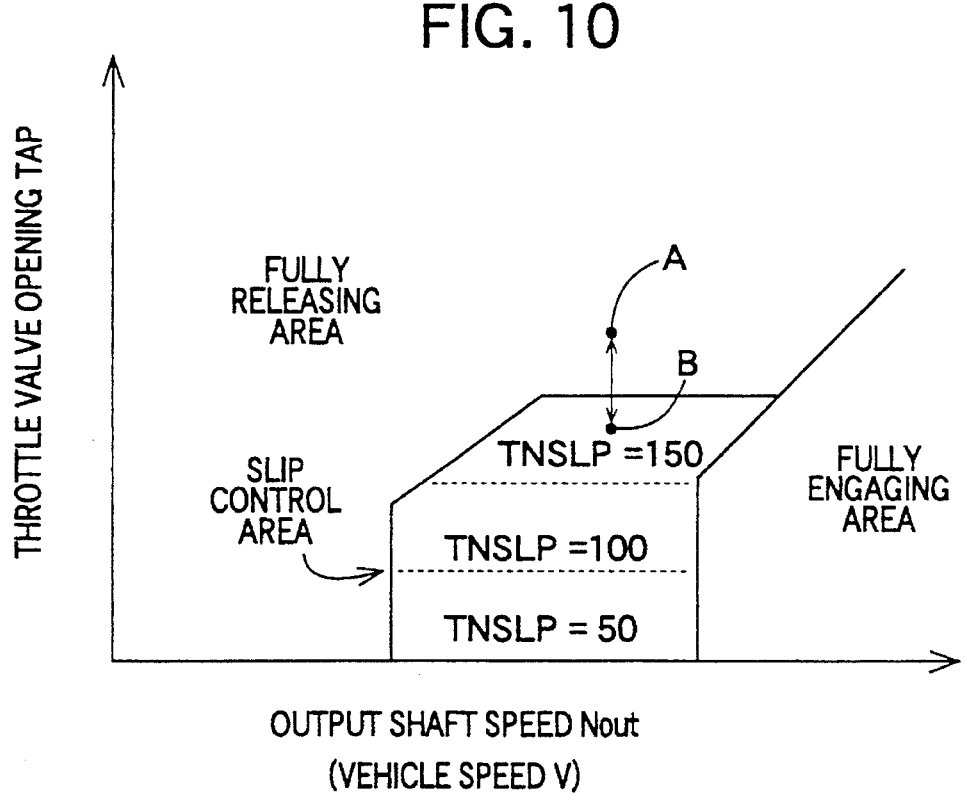
FIG. 10 is a graph indicating a relationship used to determine a target slip speed $TN_{SLP}$ used in the slip control routine of FIG. 9.
Figure 11:
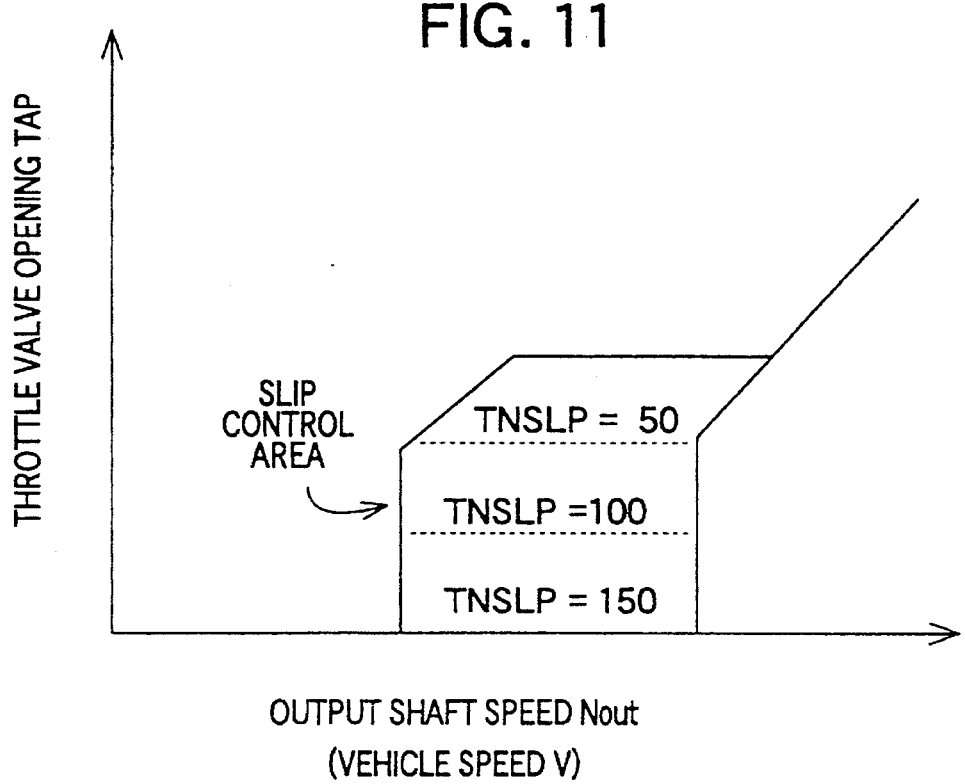
FIG. 11 is a graph indicating another relationship used to determine the target slip speed $TN_{SLP}$.

When the vehicle running condition falls in the slip control area as indicated in FIG. 7, the slip control means 196 applies to the linear solenoid valve SLU the SLIP CONTROL current $I_{SLU}$ so that the valve SLU is operated at the duty ratio $D_{SLU}$ as calculated according to the above equation (2) so that the actual slip speed $N_{SLP}$ (=$N_E$−$N_T$) coincides with the target slip speed $TN_{SLP}$, which is determined on the basis of the detected throttle valve opening TAP and output shaft speed Nout (corresponding to the vehicle speed V) and according to the predetermined relationship as indicated in the graph of FIGS. 10 or 11.

The throttle valve opening TAP used in the slip control of the lock-up clutch 32 is an average or the smaller one of the amount of opening 81 of the first throttle valve 166 and the amount of opening 82 of the second throttle valve 192. As indicated above, the amount of opening 81 of the first throttle valve 166 is detected by the throttle sensor 167. The amount of opening 82 of the second throttle valve 192 is detected by a suitable throttle sensor (not shown) or calculated on the basis of a drive signal applied to the throttle actuator 190.

The traction control device 198 is adapted to control the amount of opening 82 of the second throttle valve 192 so as to prevent slipping of the vehicle drive wheels on the road surface and to thereby maximize the effective vehicle drive force or traction force and the running stability of the vehicle.

The traction control monitoring means 200 is adapted to determine whether the traction control device 198 is in operation, namely, whether the second throttle valve 192 is operated by the traction control device 198. The clutch torque holding means 202 is adapted to maintain the torque currently transmitted through the lock-up clutch 32, if the traction control monitoring means 200 determines that the second traction control device 198 is in operation. The initiating condition monitoring means 204 determines whether the condition for initiating the slip control of the lock-up clutch 32 by the slip control means 196 is satisfied or not. If this slip control initiating condition is satisfied and if the traction control device 198 is not in operation, the clutch torque holding means 202 permits the slip control means 196 to initiate the slip control of the clutch 32. If the traction control device 198 is in operation, the clutch torque holding means 202 inhibits the slip control means 196 from initiating the slip control of the clutch 32, so as to maintain the current torque of the clutch 32, even if the slip control initiating condition is satisfied. If the traction control monitoring means 200 determines that the traction control device 198 is in operation while the clutch 32 is controlled in the slip control mode by the slip control means 196, the clutch torque holding means 202 maintains the presently effective target slip speed $TN_{SLP}$ so that the torque of the clutch 32 is held at the present value.

The operation of the transmission controller 184 having the functions as described above will be described by reference to the flow chart of FIG. 9. The routine illustrated in this flow chart is executed while the lock-up clutch 32 is in the fully released position, that is, while the vehicle running condition is in the fully releasing area indicated in FIGS. 7, 10 and 11.

Figure 9:
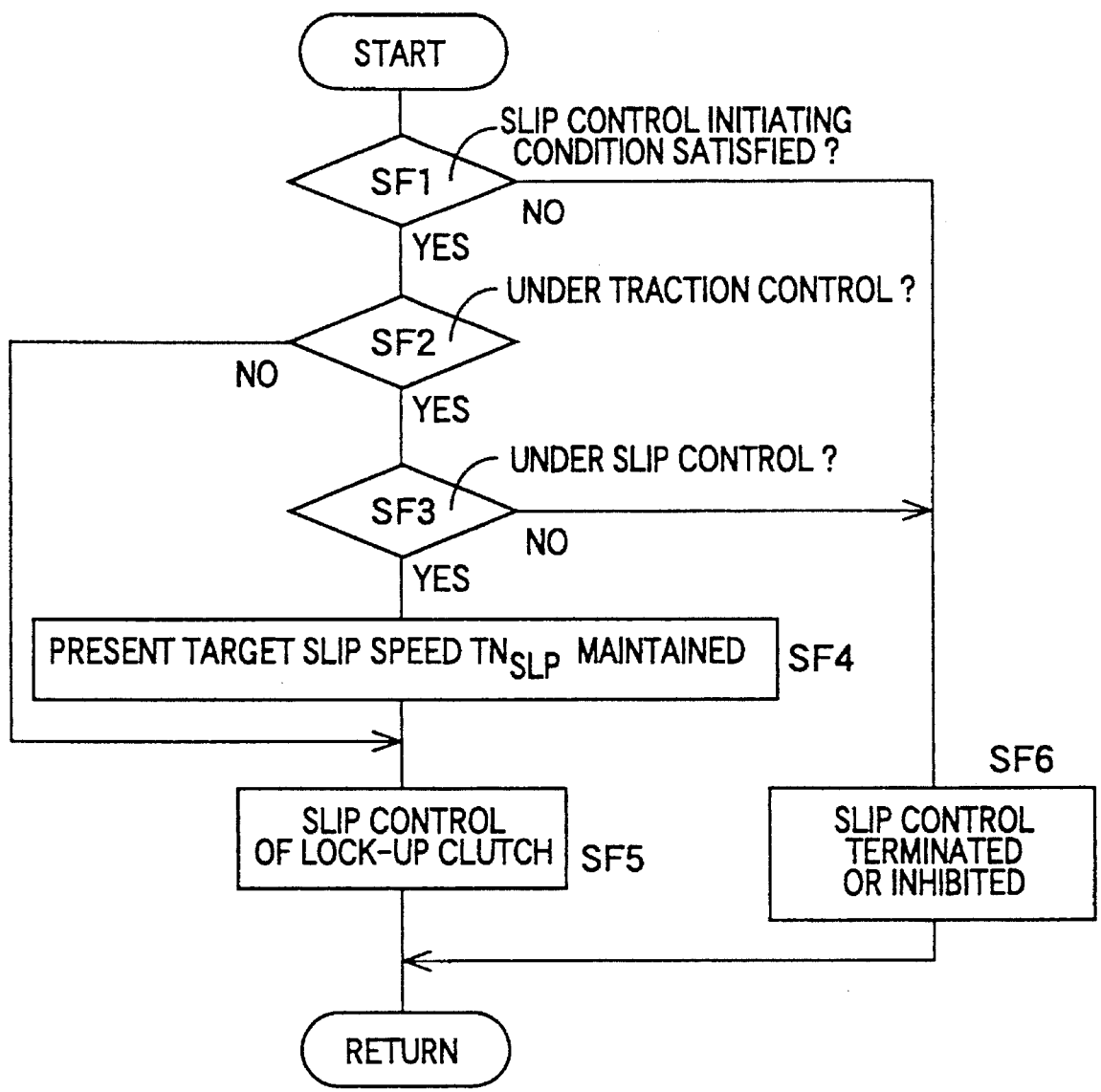
FIG. 9 is a flow chart schematically illustrating an operation of the slip control apparatus.

The routine of FIG. 9 is initiated with step SF1 corresponding to the initiating condition monitoring means 204, to determine whether the condition for initiating the slip control of the lock-up clutch 32 is satisfied. If a negative decision (NO) is obtained in step SF1, the control flow goes to step SF6 to terminate a slip control operation of the clutch 32 which has been initiated, or inhibit the initiation of the slip control operation. If an affirmative decision (YES) is obtained in step SF1, the control flow goes to step SF2 corresponding to the traction control monitoring means 200, to determine whether the traction control device 198 is in operation to control the amount of opening θ2 of the second throttle valve 192.

If a negative decision (NO) is obtained in step SF2, namely, while the traction control device 198 is not in operation, step SF5 corresponding to the slip control means 196 is implemented to effect the slip control operation of the lock-up clutch 32. In this slip control operation, the target slip speed $TN_{SLP}$ is determined on the basis of the currently detected throttle valve opening TAP and output speed Nout (vehicle speed V) and according to the predetermined relationship as indicated in the graph of FIG. 10, for example. Further, the control error $\Delta E$ (=$TN_{SLP}-N_{SLP}$) between the actual slip speed $N_{SLP}$ and the determined target slip speed $TN_{SLP}$ is calculated, and the duty ratio $D_{SLU}$ for zeroing the control error $\Delta E$ is calculated according to the above equation (2). The SLIP CONTROL current $I_{SLU}$ corresponding to the calculated duty ratio $D_{SLU}$ is applied to the linear solenoid valve SLU to control the amount of slip of the lock-up clutch 32.

If an affirmative decision (YES) is obtained in step SF2, that is, while the traction control is being effected by the traction control device 198, the control flow goes to step SF3 to determine whether the slip control means 196 is in operation to control the lock-up clutch 32 in the slip control mode. If a negative decision (NO) is obtained in step SF3, namely, while the slip control means 196 is not in operation, it means that the slip control means 196 is going to initiate the slip control operation of the lock-up clutch 32 with the slip control initiating condition satisfied (affirmative decision obtained in step SF1). In this case, step SF6 is implemented to inhibit the initiation of the slip control operation since it is considered that the slip control initiating condition is satisfied as a result of reduction of the throttle valve opening TAP by the traction control device 198.

If an affirmative decision (YES) is obtained in step SF3, on the other hand, it means that the slip control means 196 is in operation or the slip control operation has been initiated. In this case, the control flow goes to step SF4 to inhibit the target slip speed $TN_{SLP}$ from being updated, namely, to maintain the target slip speed $TN_{SLP}$ at the presently effective value. Step SF4 is followed by step SF5 to effect the slip control operation with the presently effective target slip speed $TN_{SLP}$. It will be understood that steps SF4 and SF6 correspond to the clutch torque holding means 202 for maintaining the torque transmitted through the lock-up clutch 32, so as to avoid control a interference between the slip control means 196 and the traction control device 198. More specifically, the clutch torque maintaining means 202 is adapted to inhibit the slip control means 196 from initiating the slip control operation if the slip control initiating condition is satisfied as a result of a traction control by the traction control device 198, and to maintain the presently effective target slip speed $TN_{SLP}$ if the traction control is initiated during the slip control operation of the lock-up clutch 32.

In the present embodiment of this invention described above, torque transmitted through the lock-up clutch 32 is maintained by implementation of steps SF4 and SF6 corresponding to the clutch torque holding means 202 in the case where an operation of the traction control device 198 is detected in step SF2 corresponding to the traction control monitoring means 200. According to this arrangement, the torque transmitted to the automatic transmission 14 through the torque converter 12 equipped with the lock-up clutch 32 will not fluctuate due to the slip control of the clutch 32 during the traction control operation, without a control interference between the traction control and the slip control of the lock-up clutch 32. Therefore, not only the traction control by the traction control device 198 is stabilized, but also the slip control of the clutch 32 by the slip control means 196 is stabilized without an influence of changes of the amount of opening 82 of the second throttle valve 192 by the traction control device 198.

Explained in more detail, the torque transmitting state of the lock-up clutch 32 is maintained by inhibiting the slip control of the lock-up clutch 32 in step SF6 (corresponding to the clutch torque holding means 202), if the traction control operation of the clutch 32 is going to be initiated (negative decision in step SF3) while the slip control condition is satisfied (affirmative decision in step SF1 corresponding to the initiating condition monitoring means 204) with the traction control being effected by the traction control device 198 (affirmative decision in step SF2 corresponding to the traction control monitoring means 200). In other words, the lock-up clutch 32 is held in its fully released state even if the vehicle running condition changes into the slip control area of FIG. 7 (FIGS. 10 and 11) as a result of a change in the throttle valve opening TAP caused by the traction control device 198. Therefore, during the traction control, the power of the engine 10 is stably transmitted to the automatic transmission 14 primarily by the torque converter 12, without the torque being transmitted through the lock-up clutch, and without a control interference with the slip control of the lock-up clutch 32.

Further, the torque transmitting state of the lock-up clutch 32 is maintained by maintaining the presently effective target slip speed $TN_{SLP}$ in step SF4 (corresponding to the clutch torque holding means 202), if the traction control by the traction control device 198 is detected in step SF2 (corresponding to the traction control monitoring means 200) while the slip control means 196 is in operation (affirmative decision in step SF3). According to this arrangement, the slip control of the clutch 32 is effected (step SF5) such that the target slip speed $TN_{SLP}$ is held constant even if the throttle valve opening TAP is changed by the traction control device 198 during the traction control operation, contrary to the normal slip control without the traction control (negative decision in step SF2), wherein the target slip speed $TN_{SLP}$ is changed as the throttle valve opening TAP is changed, as indicated in the graphs of FIGS. 10 and 11. The present arrangement assures increased stability of the traction control without a change in the torque of the clutch 32, namely, without a control interference with the slip control.

Figure 12:
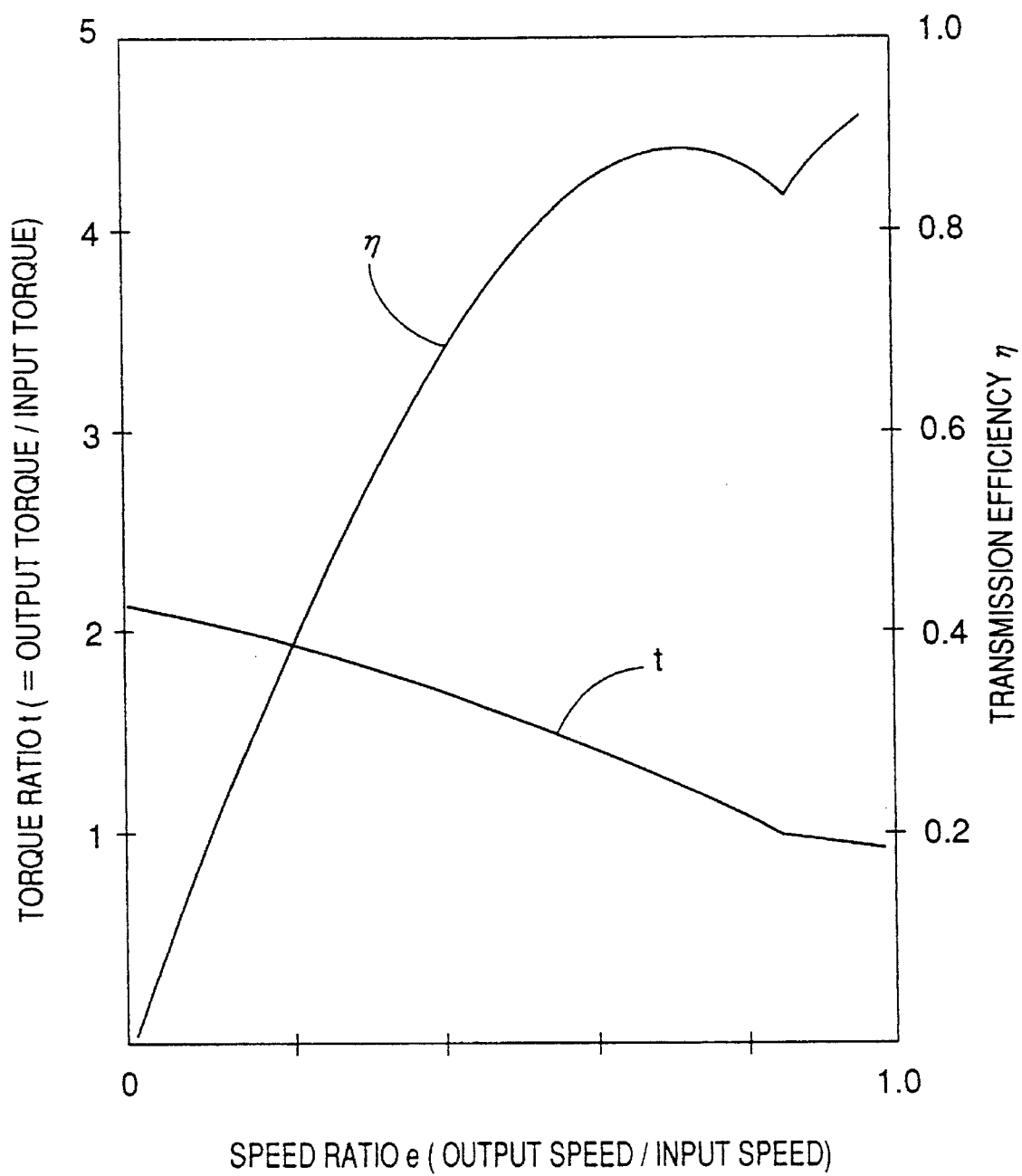
FIG. 12 is a graph indicating operating characteristics of the torque converter.

The torque converter 12 has the torque transmitting characteristic as shown in the graph of FIG. 12. As is apparent from the graph, the torque amplifying ratio or torque ratio "t" of the torque converter 12 decreases with an increase in the speed ratio "e". The torque ratio "t" is a ratio of the output torque to the input torque of the torque converter 12, while the speed ratio "e" is a ratio of the output speed (turbine impeller speed) to the input speed (pump impeller speed) of the torque converter 12. In the conventional slip control apparatus for the lock-up clutch, the speed difference of the torque converter 12 is reduced, and the torque ratio "t" is lowered with a result of excessively reducing the torque transmitted to the automatic transmission 14 through the torque converter 12, if the lock-up clutch 32 is controlled in the slip control mode as a result of reduction of the throttle valve opening TAP from point A down to point B as indicated in FIG. 10 by the traction control device 198. When the slipping tendency of the vehicle drive wheels on the road surface is removed, the throttle valve opening TAP is increased from the Point B back to the original point A by the traction control device 198. Consequently, the slip control of the lock-up clutch 32 is terminated, and the clutch 32 is placed in the fully released state. As a result, the speed difference of the torque converter 12 is increased, and the torque transmitted through the torque converter 12 is excessively increased. Similar problem is experienced in the conventional slip control apparatus when the throttle valve opening TAP is changed during the slip control operation of the clutch 32, that is, within the slip control area. In the case where the target slip speed $TN_{SLP}$ is reduced as the throttle valve opening TAP is reduced as indicated in the graph of FIG. 10, a decrease in the throttle valve opening TAP results in a decrease in the torque ratio "t" and an excessive decrease in the transmission torque of the torque converter 12, while an increase in the throttle valve opening TAP results in an increase in the torque ratio "t" and an excessive increase in the transmission torque of the converter 12. Thus, the changes in the throttle valve opening TAP by the traction control device 198 and the corresponding changes of the target slip speed $TN_{SLP}$ cause unstable control of the torque transmitted to the automatic transmission 14 through the torque converter 12. In the case where the target slip speed $TN_{SLP}$ is increased as the throttle valve opening TAP is increased as indicated in the graph of FIG. 11, a decrease in the throttle valve opening TAP results in an increase in the torque ratio "t", which offsets the torque control effect of the torque converter 12, while an increase in the throttle valve opening TAP results in a decrease in the torque ratio "t", which also offsets the torque control effect of the torque converter 12.

While the present invention has been described above in detail in its presently preferred embodiment by reference to the accompanying drawings, it is to be understood that the invention is not limited to the details of the illustrated embodiment, but may be otherwise embodied.

In the illustrated embodiment, the target slip speed $TN_{SLP}$ used in the slip control of the lock-up clutch 32 is determined according to the predetermined relationship as illustrated in the graph of FIGS. 10 or 11. However, other relationships may be used to determine the target slip speed $TN_{SLP}$. For example, the target slip speed $TN_{SLP}$ may be determined as a function of the speed $N_T$ of the turbine impeller 22. A predetermined constant value may be used as the target slip speed $TN_{SLP}$.

Although the output of the engine 10 is controlled by the two throttle valves (first throttle valve 166 operated by the accelerator pedal 165, and second throttle valve 192 actuated by the throttle actuator 190 for the traction control), it is possible to use a single throttle valve which is operated by the accelerator pedal 165 and throttle actuator 190.

While the hydraulic control device 44 is constructed as shown in FIG. 4, the construction of the device 44 may be modified as needed. For instance, the lock-up relay valve 52 and the lock-up clutch control valve 56 may be combined into a unitary structure.

It is to be understood that the present invention may be embodied with various other changes, modifications and improvements, which may occur to those skilled in the art, without departing from the spirit and scope of the invention defined in the following claims.

What is claimed is:

1. An apparatus for controlling an amount of slip of a lock-up clutch disposed between a pump impeller and a turbine impeller of a torque converter of a motor vehicle having a traction control device for controlling throttle valve means of an engine so as to prevent excessive slipping of drive wheels of the vehicle, said apparatus including slip control means for controlling the amount of slip of said lock-up clutch in a slip control mode such that an actual slip speed of said lock-up clutch coincides with a predetermined target slip speed while a running condition of the vehicle is in a predetermined slip control area which is partially defined by an amount of opening of said throttle valve means, said apparatus comprising:

traction control monitoring means for determining whether said traction control device is in operation to control the amount of opening of said throttle valve means; and clutch torque holding means for maintaining a present torque transmitting state of said lock-up clutch as long as said traction control monitoring means determines that said traction control device is in operation.

2. An apparatus according to claim 1, further comprising initiating condition monitoring means for determining whether a slip control initiating condition required for initiating slip control of said lock-up clutch by said slip control means is satisfied, and wherein said clutch torque holding means inhibits said slip control means from initiating said slip control of said lock-up clutch even when said initiating condition monitoring means determines that said slip control initiating condition is satisfied, if said traction control monitoring means determines, prior to the initiation of said slip control, that said traction control device is in operation.

3. An apparatus according to claim 1, wherein said clutch torque holding means maintains said target slip speed at a presently effective value to thereby maintain said present torque transmitting state of said lock-up clutch, if said traction control monitoring means determines, during slip control of said lock-up clutch by said slip control means, that said traction control device is in operation.

4. An apparatus according to claim 3, wherein said slip control means includes means for changing said target slip speed as a function of an output torque of said engine.

5. An apparatus according to claim 4, wherein said means for changing said target slip speed changes said target slip speed as a function of the amount of opening of said throttle valve means.

6. An apparatus according to claim 1, wherein said throttle valve means comprises a first throttle valve operated by an accelerator pedal of the vehicle, and a second throttle valve which is normally fully open and which is controlled by said traction control device to prevent the excessive slipping of the drive wheels, said slip control means obtaining, as said amount of opening of said throttle valve means, an average of an amount of opening of said first throttle valve and an amount of opening of said second throttle valve.

7. An apparatus according to claim 1, wherein said throttle valve comprises a first throttle valve operated by an accelerator pedal of the vehicle, and a second throttle valve which is normally fully open and which is controlled by said traction control device to prevent the excessive slipping of the drive wheels, said slip control means obtaining, as said amount of opening of said throttle valve, a smaller one of an amount of opening of said first throttle valve and an amount of opening of said second throttle valve.

8. An apparatus according to claim 1, wherein said slip control means determines whether the running condition of the vehicle falls in said slip control means, depending upon a first parameter indicative of an output torque of said engine and a second parameter indicative of a running speed of the vehicle.

9. An apparatus according to claim 8, wherein said first parameter is the amount of opening of said throttle valve means.

* * * * *